Nov. 8, 1966  J. T. CASS  3,283,905
SELF-CLOSING MAGNETIC PLUG
Filed Oct. 23, 1965  2 Sheets-Sheet 1
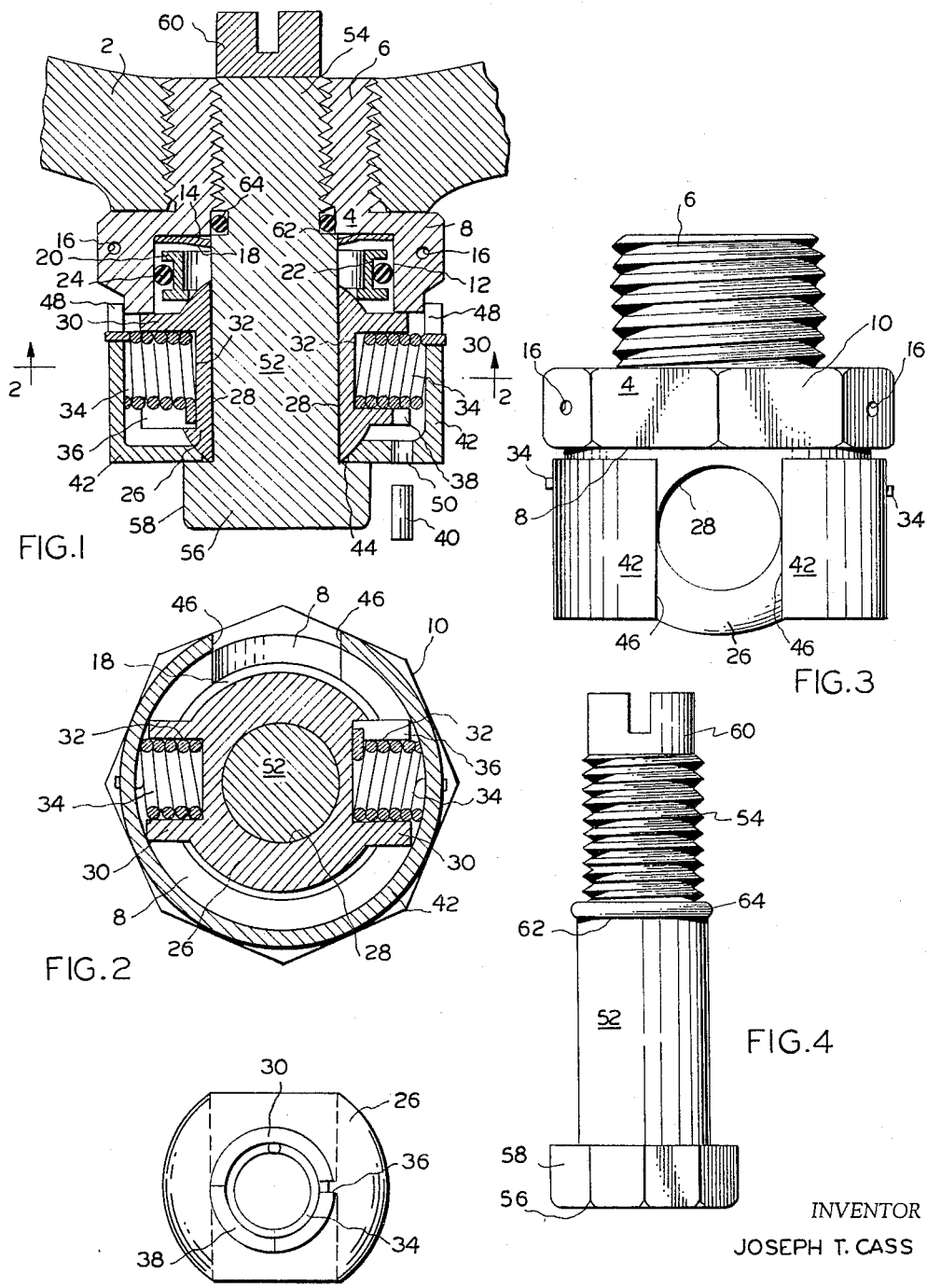
INVENTOR
JOSEPH T. CASS
BY *Philpitt, Steininger & Priddy*
HIS ATTORNEYS Nov. 8, 1966  J. T. CASS  3,283,905

SELF-CLOSING MAGNETIC PLUG

Filed Oct. 23, 1965  2 Sheets-Sheet 2

United States Patent Office 3,283,905
Patented Nov. 8, 1966

3,283,905
SELF-CLOSING MAGNETIC PLUG
Joseph T. Cass, 3528 Edgewater Lane, Chester, Pa.
Filed Oct. 23, 1965, Ser. No. 507,989
18 Claims. (Cl. 210—222)

The present application is a continuation-in-part of application Serial No. 368,526, filed May 19, 1964, now abandoned.

The present invention relates to a drain unit for gear cases and the like. More specifically, the present invention relates to an improved self-closing, magnetic drain unit for gear cases or the like.

In many instances, gear cases and other lubricant reservoirs, used in connection with various types of equipment, require periodic draining and replacement of the lubricant. In addition, in many instances, it is also highly desirable that minute particles of iron and steel which become entrained in the lubricant be removed between such drain intervals and particularly before such particles create deteriorating and hazardous wear on the gears and other moving parts being lubricated. It is thus quite important that such particles be removed as rapidly as possible, not only to eliminate damage to moving parts but also to increase the period during which the lubricant can be used without replacement.

Magnetic drain plugs have heretofore been used in the art to collect metallic particles entrained in lubricants. It has also been known practice to construct such drain plugs in a manner such that they will be self-closing when the magnet is removed for inspection or the cleaning of accumulated particles therefrom. However, such prior art devices have a number of significant disadvantages. In some instances the magnet is partially enclosed in the casing of the drain unit, thereby preventing free access of the lubricant to the magnet. This, of course, has been a necessity in those drain units having a self-closing valve, since the valve is normally mounted above the magnet in the unit. On the other hand, if the magnet passes completely through the drain unit and into the interior of the gear case, no practical means has been provided for automatically closing the drain unit when the magnet is removed.

It is, therefore, an object of the present invention to provide an improved drain unit for gear cases and the like.

Another object of the present invention is to provide an improved self-closing, magnetic drain unit for gear cases and the like.

Another object of the present invention is to provide a self-closing, magnetic drain unit adapted to conserve lubricant.

Another and further object of the present invention is to provide a self-closing, magnetic drain unit in which the magnet is fully exposed to lubricant in a gear case.

A still further object of the present invention is to provide a self-closing, magnetic drain unit in which the magnet may be easily removed with a minimum of time and effort.

Another object of the present invention is to provide a self-closing, magnetic drain unit which is compact and made up of a minimum number of parts.

These and other objects of the present invention will be obvious from the following detailed description, when read in conjunction with the drawings, wherein:

FIGURE 1 is a cross-sectional view of one embodiment of the drain unit taken on a vertical plane through the center;

FIGURE 2 is a cross-sectional view taken along the line 2—2 of FIGURE 1;

FIGURE 3 is a side view of the housing and valve portion of the drain unit of FIGURE 1, with the valve in its closed position;

FIGURE 4 is a side view of the plug of the drain unit of FIGURE 1, removed from the unit;

FIGURE 5 is a side view of the valve of the drain unit of FIGURE 1;

Figure 7:
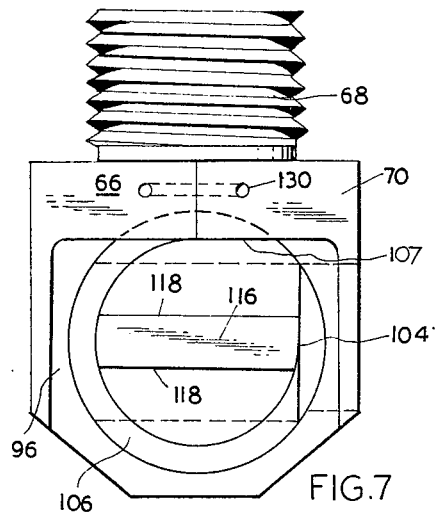
FIGURE 7 is a side elevational view of the housing and valve portion of the drain unit of FIGURE 6, with the valve in its closed position.

Referring now in detail to FIGURES 1 through 5 of the drawings, 2 represents the bottom of a gear case or the like partially in section. Normally, the opening in the bottom of gear case 2 is slightly lower than the remainder of the gear case and such opening is threaded, as shown in FIGURE 1. The drain unit of the present invention is inserted in the opening formed in gear case 2 by means of annular, upper casing member 4. Upper portion 6 of casing member 4 is threaded internally to accommodate the plug, as hereinafter mentioned, and externally to cooperate with the threaded portion of gear case 2. The bottom portion 8 of casing member 4 is formed into an enlarged flange having a gripping surface 10, such as the octagonal nut form shown, and an inner bore 12, which is larger than the bore through threaded portion 6 of the casing and therefore forms a shoulder 14 where it meets threaded section 6. Preferably, small bores 16 are formed in flange portion 8 of upper casing member 4. Bores 16 are designed to accommodate a wire (not shown) which is fastened to a stationary member of the gear case assembly and properly secured. By utilizing an anchor wire in this fashion, upper casing 4 cannot work itself loose from gear case 2 and thus permit the accidental loss of lubricant and consequent damage to the machinery involved.

Mounted in bore 12 of flange portion 8 is an annular washer-shaped spring 18. Spring 18 has a central opening substantially equal to the size of the bore through threaded section 6 of casing member 4 and resets on shoulder 14 where threaded section 6 and flange section 8 meet. Resting against and pressed downwardly by spring 18 is valve seat 20. Valve seat 20 is also annular in form and has a central opening slightly larger than the bore through threaded section 6 of upper casing 4, for reasons which will be pointed out hereinafter. Resting in an annular slot 22 of valve seat 20 is packing 24. Packing 24 serves as a seal between valve seat 20 and the walls of bore 12 of upper casing 4. Ball-shaped valve 26 is larger in diameter than the minor diameter of valve seat 20 and, therefore, is adapted to partially enter the valve seat and cooperate therewith to form a seal. Passing through valve 26 is bore 28, which is also substantially the same size as the bore through threaded section 6 of upper casing 4. Formed on two opposing sides of valve 26 are cylindrical pivot extensions 30. Pivot extensions 30 are perpendicular to bore 28 of valve 26 and have formed therein bores 32. Bores 32 are designed to accommodate coil springs 34. One end of coil springs 34 is anchored to valve 26 by passing an extended end through a slot 36 formed in pivots 30 and valve 26.

A depression or slot 38 is also formed on one of pivots 30 and extends approximately 90° about the edge of said pivot. Depression 38 is adapted to accommodate stop means 40 and thereby limit the rotation of valve 26.

With washer-type spring 18, valve seat 20 and valve 26 in place, the housing of the drain unit is completed by lower cup-shaped casing 42. Lower casing 42 has formed therein a lower spring 44, whose diameter is substantially equal to the diameter of bore 28 in valve 26 and which extends across one side of the bottom and up one side of lower casing 42 to form a slot 46 of substantially the same width as the diameter of opening 44. The other ends of coil springs 34 are anchored in lower casing 42 by passing these ends through slots 48 formed near the top of lower casing 42. Lower casing 42 is then fastened to upper casing 4 by appropriate pin means or the like (not shown). Valve 26 is then turned to tension springs 34 and align bore 28 with the bore through threaded section 6 of upper casing 4. Stop means 40 is then inserted through bore 50 of lower casing 42 and thence into depression 38. Thus, valve 26 will be biased toward its closed position by springs 34 and will be stopped by stop means 40 when it has been rotated 90° from its open position.

Passing through lower casing 42, bore 28 of valve 26 and upper casing 4 is plug 52. Plug 52 is of such length that it will extend completely through lower casing 42 and upper casing 4 when the two are assembled to form the housing. Upper end 54 of plug 52 is threaded to cooperate with the internal threads of threaded section 6 of upper casing 4. Enlarged flange section 56 is formed on the opposite end of plug 52 to rest against the bottom of lower casing 42. Flange 56 has formed on its periphery a gripping surface 58, such as the octagonal nut shown. Mounted on the threaded end of plug 52 is permanent magnet 60. As can be seen, magnet 60 projects through the housing of the drain unit and into the body of lubricant in gear case 2 and is thus completely exposed to lubricant in gear case 2. The magnet, of course, can be made even longer than shown and thus provide still better contact with the lubricant in gear case 2. Mounted in annular slot 62, formed about plug 52, is packing element 64. Packing element 64 is located immediately below threaded section 64 of plug 52 and such a distance from the end of magnet 60 that packing 64 will remain in bore 28 of valve 26 until the end of magnet 60 clears the interior of the housing.

In actual operation, plug 52 is unscrewed from upper casing 4 and pulled downwardly through valve 26. Magnet 60 will clear the inside of the housing as just about the same moment that packing 64 reaches the bottom of bore 28 of valve 26. As soon as magnet 60 clears the interior of the housing, springs 34 will rotate valve 26 and plug 52 and plug 52 will rotate from opening 44 through slot 46. Stop means 40 will stop this rotation when valve 26 has rotated 90° as shown in FIGURE 3. Plug 52 may then be removed completely from bore 28 and inspected and/or cleaned, as desired. In the meantime, there has been no loss of lubricant through the drain passage in the housing of the drain unit. It is, course, obvious that gear case 2 can be drained of lubricant by merely removing the entire drain unit by gripping surface 10 an appropriate wrench.

Figure 6:
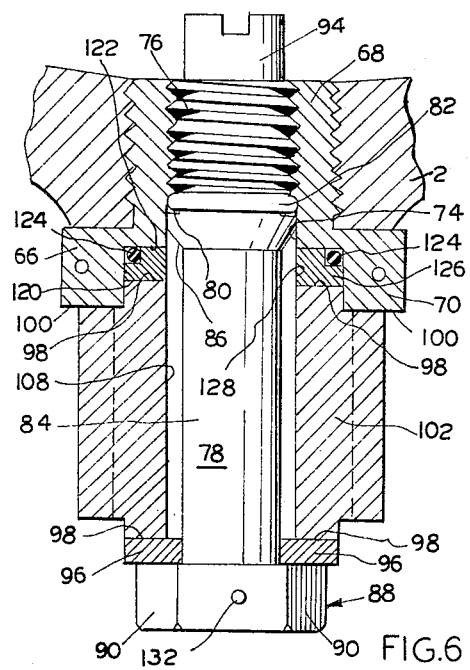
FIGURE 6 is a cross-sectional view of another embodiment of the drain unit taken along a central, vertical plane through the housing and valve and showing the plug in place in the unit.
Figure 9:
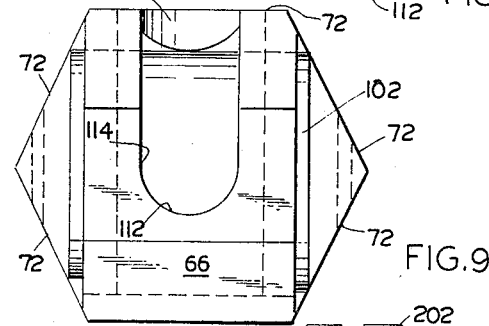
FIGURE 9 is a bottom view of the housing and valve of FIGURE 8.

In accordance with the embodiment shown in FIGURES 6 through 9, the casing or housing 66 is shown mounted in gear case 2. Housing 66 includes upper, externally-threaded section 68 adapted to pass through an appropriately tapped opening in gear case 2. Immediately below upper threaded section 68 of housing 66 is intermediate flange section 70. Flange section 70 has formed about its periphery gripping surfaces or flats 72 adapted to accommodate an open-ended wrench or the like. The upper surface of flange portion 70 frictionally engages a portion of gear case 2 when housing 66 is threaded into gear case 2 as far as possible. Upper portion 68 of housing 66 has formed therethrough a bore 74 adapted to serve as a drain passage in open communication with the interior of gear case 2. At least the upper portion of bore 74 is internally threaded to receive and cooperate with threaded section 76 of plug 78. Below threaded section 76 of plug 78 an annular groove 80 is formed. Annular groove 80 is adapted to receive packing element or O ring 82. O ring 82 is adapted to seal against the smooth portion of bore 74 when plug 78 is in its uppermost position. Plug 78 has its intermediate portion 84 formed as a reduced diameter section. Accordingly, shoulder 86 is formed where reduced diameter section 84 enlarges to form the upper portion 76 of the plug. The lowermost portion of plug 78 has enlarged flange section 88 which is adapted to frictionally engage the bottom of housing 66 when plug 78 is in its uppermost position. Flange section 88 has formed about its periphery gripping surfaces or flats 90 adapted to receive an open-ended wrench or the like. Gripping surfaces 90 may also be knurled or otherwise roughened to form a surface which may be gripped by hand. Mounted on the upper free end of plug 78 is magnet means 94. Magnet 94 may take any appropriate shape. In the preferred embodiment shown, magnet 94 extends into the interior of gear case 2 to thereby be freely exposed to the oil in gear case 2. Lower section 96 of housing 66 has formed therein perpendicular to the axis of bore 74 an enlarged bore 98. Bore 98 passes entirely through lower section 96 of housing 66 except for the shoulders or stops 100 formed by intermediate section 70 of the housing. Mounted in bore 98 is valve means 102. Valve means 102 is substantially cylindrical in configuration except for the flat side 104, which extends the entire length of valve 102. The flat side 104 is adapted to clear shoulders 100 of flange section 70 when valve 102 is rotated 270° clockwise from the position shown in FIGURE 7. Flat portion 104 also extends beyond shoulders 100 to thereby also act as a stop to stop the rotation of valve 102 with flat portion 104 aligned with shoulders 100 of flange 70. In this aligned position valve 102 may be removed from housing 66 by simply pushing the valve laterally out the side of housing 66. Each end of valve 102 has formed therein annular, peripheral grooves 106 which extend about 270° around the periphery of valve 102. Grooves 106 thus receive shoulders 100 thereby permitting valve 102 about 270° of rotation and preventing the removal of valve 102 except when flat portion 104 is aligned with shoulders 100. By the same token annular grooves 106 permit valve 102 to rotate through 270° from the position where flat portion 104 is in alignment with shoulders 100, and stop the rotation when the flat section 107 of annular groove 106 is against shoulders 100 and the bore 108 in valve 102 is perpendicular to drain passage 74 in housing 66, as shown in FIGURE 7. At this time, the valve is closed and bore 108 of valve 102 is in alignment with enlarged aperture 110 in housing 66. In this position plug 78 may be inserted through aperture 110 and into bore 108 until magnet 94 strikes the side wall of bore 98 of housing 66. Plug 78 can now be used as a lever to rotate valve 102 90° clockwise and thereby align bore 108 of valve 102 with bore 128 in valve seat 126, bore 74 in housing 66, and aperture 112 of housing 66, through slot 114. While such rotation of valve 102 is carried out, O ring 82 is in sealing engagement with bore 108, thus preventing any loss of fluid from the reservoir. An axial, upward push of plug 78 causes threaded portion 76 of plug 78 to contact the internal threads of upper portion 68 of housing 66. Plug 78 may now be screwed into housing 66 until flange section 88 engages lower section 96 of housing 66, as shown in FIGURE 6. Plug 78 may be unscrewed from upper portion 68 of housing 66 and withdrawn downwardly through bore 74 of housing 66 and bore 128 of valve seat 126 and into bore 108 of valve 102. Shoulder 86 will then rest against the edges of aperture 112 and prevent complete removal of plug 78 through housing 66. Thus, the periphery of aperture 112 acts as a stop against shoulder 86 and prevents removal of the plug 78 and loss of fluid from the reservoir when valve 102 is open. However, when plug 78 is in this lowermost position magnet 94 is completely within bore 108 of valve 102 and will clear the interior walls of housing 66. Plug 78 may thereafter be rotated through slot 114 to a position perpendicular to the axis of bore 74. When in this position plug 78 may then be withdrawn completely from valve 102 and housing 66 through enlarged aperture 110 and the magnet inspected. Extending from the ends of valve 102 are flanges 116 having gripping surfaces 118 which are adapted to receive an open-ended wrench, or the like. By gripping flanges 116 with a wrench, or the like, valve 102 may be rotated in its opposite direction until flat portion 104 registers with shoulders 100 and the valve may then be removed from housing 66. The valve may, of course, be reinserted in the same fashion and rotated until bore 108 is perpendicular to bore 74 and plug 78 may be reinserted. Flanges 116 also serve to facilitate draining of the reservoir. This is done by removing plug 78 and rotating valve 102 to align bore 108 with bore 74 and aperture 112. Housing 66 has formed therein enlarged bore 120 having its axis aligned with the axis of bore 74. Enlarged bore 120 therefore forms a shoulder 122. Mounted on shoulder 122 is packing element or O ring 124. Mounted just below O ring 124 is annular valve seat 126. Annular valve seat 126 has its lower surface formed to seal against the cylindrical portion of valve 102. Valve seat 126 is preferably made of softer metal than the remainder of the plug unit, or of Teflon, nylon or other suitable materials. O ring 124 is sized so as to resiliently press valve seat 126 against the cylindrical surface of valve 102. Valve seat 126 has formed therethrough bore 128 of substantially the same diameter as bore 72 and bore 108. Apertures 130 through section 70 of housing 66 are adapted to receive wires which are attached to gear case 2; and apertures 132 in section 88 of plug 78 receive wires attached to housing 66 to lock housing 66 and plug 78 in place and prevent accidental removal.

Figure 8:
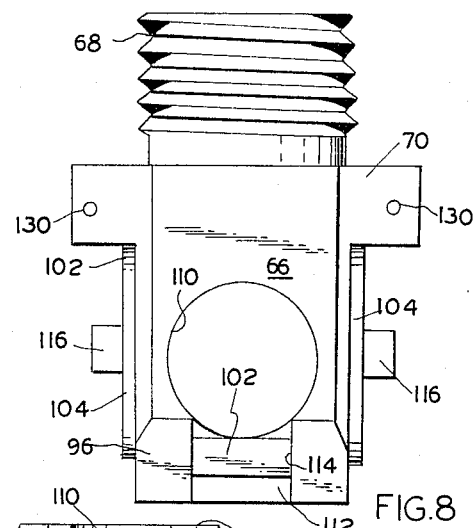
FIGURE 8 is a front elevational view of the housing and valve of FIGURE 7.

The operation of the embodiment shown in FIGURES 6 through 9 is quite obvious from the previous description of the drawings. To recapitulate, valve 102 may be completely removed from or inserted in housing 66 by gripping flanges 116 with a wrench or the like and turning the valve until flat portion 104 is aligned with the bottom shoulders 100 of housing section 70. With valve 102 in place in housing 66, the valve may be rotated 90° clockwise, as shown in FIGURES 7 and 8, so as to place it in position to receive plug 78. Plug 78 may then be inserted through aperture 110 in housing 66 and into bore 108 in valve 102. Reduced-diameter portion 84 of plug 78 is then rotated through another 90° of clockwise rotation to align bore 108 with bore 74 in housing 66. Upward movement of plug 78 then causes the plug to enter bore 74 and the threads on section 76 of the plug to engage the threads in upper section 68 of the housing. Plug 78 is then screwed into the housing until flange section 88 of plug 78 is in frictional engagement with the bottom of housing 66. At this point magnet 94 projects into gear case 2 where it is freely exposed to lubricant in the gear case.

Figure 11:
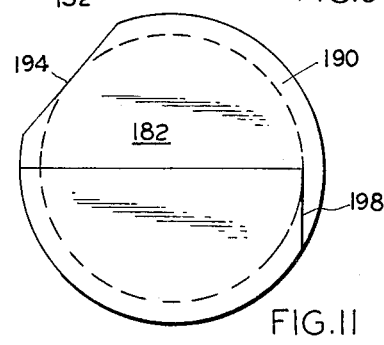
FIGURE 11 is a left side view of a valve for use in the embodiment of FIGURE 10.
Figure 10:
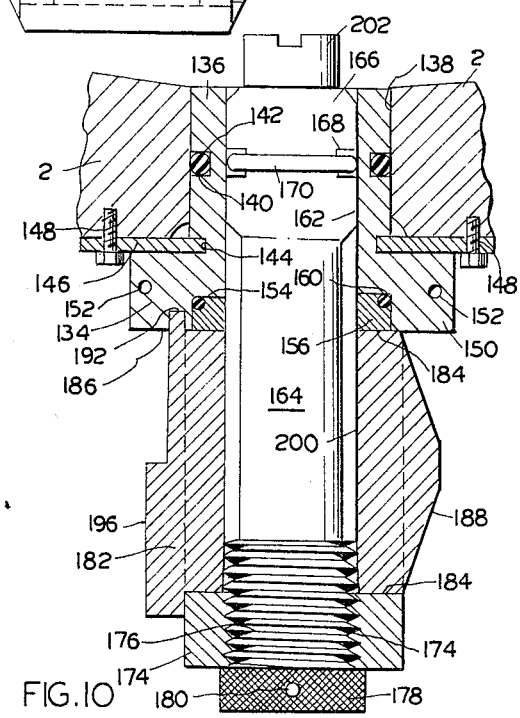
FIGURE 10 shows another embodiment of the drain unit.

FIGURES 10 and 11 show a modified drain unit in accordance with the present invention. One variation deals with the mounting of the mechanism on gear case 2. While the threaded mounting of the housing in the gear case as shown in FIGURES 1 through 9 is suitable for new installations, this type of mounting is not well adapted to old installations since it may cause the side of the valve through which the plug is removed and reinserted to assume a position where there is insufficient room to remove the plug or where it is difficult to operate. To overcome this difficulty a housing 134 is provided with an upper section 136 which is designed to fit into a smooth-walled bore 138 in gear case 2. Upper section 136 is provided with an appropriate annular groove 140 in which is disposed an annular packing element for O ring 142. O ring 142 is in compressional engagement with bore 138 of gear case 2 and therefore forms an appropriate fluid tight seal to prevent gear case fluid from leaking out about the outside of housing 134. In order to mount this particular housing in gear case 2, just below upper section 136 the housing 134 is provided with an annular groove 144. Annular groove 144 is adapted to receive a generally C-shaped retaining ring 146. Ring 146 is simply slid into position in slot 144 and is then screwed into gear case 2 by means of self-tapping screws 148 or is otherwise appropriately fastened to gear case 2. Thus, by this type of mounting housing 134 may be mounted in gear case 2 while at the same time permitting rotation of housing 134 to any desired position before the screws 148 are tightened into place. Housing 134 has formed just below slots 144 annular flange section 150. Flange 150 is provided with appropriate flats or gripping surfaces for a wrench, such as those shown in FIGURES 7, 8 and 9, and is also provided with appropriate holes 152 through which wires may be passed and the housing anchored to the gear case to prevent accidental removal. Internal, annular groove 154 is formed in flange section 150 of housing 134. Mounted within groove 154 is valve seat 156. Valve seat 156 is of exactly the same character as valve seat 126 of FIGURE 6 and serves substantially the same purpose. Valve seat 156 has formed in its exterior upper surface annular groove 158. Annular groove 158 has disposed therein packing element or O ring 160 which forms a seal between housing 134 and valve seat 156. Housing 134 has formed therethrough upper, smooth bore 162. Bore 162 is of course adapted to receive plug 164 and to serve as a passage way for draining the gear case. As may be seen from FIGURE 10, bore 162 in housing 134 is adapted to receive smooth upper section 166 of plug 164. Upper portion 166 of plug 164 is provided with an annular slot or groove 168 in which is disposed a packing element or O ring 170. Packing element 170 is in compressional engagement with bore 162 and therefore forms a seal about plug 164. Lower section 172 of housing 134 also has an internally-threaded bore 174. The lower portion 176 of plug 164 is externally threaded and is adapted to mate with the threads of bore 174 of the housing. Thus, it may be seen that, whereas in the previous embodiment the threaded section which held the plug in the housing was at the top of the plug, in the present arrangement these threads have been moved to the bottom of the plug and threaded into the bottom section of the housing rather than the top section. Also, as may be seen by reference to FIGURE 10, the threaded lower portion 176 of plug 164 is appreciably longer than the threaded bore 174 of the housing, whereby said threaded portion of the plug extends above the threaded portion 174 of the housing into the bore 200 of valve member 182. This variation is a convenience in manufacture and to some extent facilitates removal of the plug. Below threaded section 176 of plug 164 is a knurled end adapted for unscrewing plug 164 from housing 134 by hand. Knurled element 178 has formed therethrough a hole 180 which may be utilized for placement of a wire which can be attached either to the gear case or to housing 134 to prevent accidental removal or dropping of plug 164.

Another variation which is evident in the device of FIGURE 10 is the construction and means of mounting of valve 182. It is to be seen that a straight bore 184 is formed through housing 134 rather than the previously described offset bore. This, of course, facilitates manufacture of the device since it is not necessary to undercut the central portion of the bore. Bore 184, as can be seen, is flush with the bottom face or shoulder 186 of flange section 150. The right side of valve 182 has formed thereon a gripping portion 188 of slightly different shape than the previously described element but serving exactly the same purpose, that is, the turning of valve 182. On the opposite end of valve 182 is formed an enlarged flange 190. Flange 190 is designed to fit into slot 192 formed in the shoulder 186 of flange section 150. Thus, flange 190 serves to hold valve 182 in place in the housing. However, flange 190 has a flat section 194 to permit removal of valve 182 from housing 134. Flat section 194 may be made to clear shoulder 186 of the housing by simply rotating the valve 182 about 45 degrees clockwise, as viewed in FIGURE 11. The valve may then be pushed outwardly to the left in FIGURE 10. Flange 190 has enlarged section 196 formed at the lower portion of valve 182. Section 196 has formed thereon a flat section 198, thus by rotating valve 182 counterclockwise flat section 198 will come into contact with shoulder 186 and stop the rotation of the valve after 90° of rotation. This 90° of rotation will, of course, be the position in which valve 182 is closed and bore 200 through the center of valve 182 is perpendicular to bore 162 and 174 in housing 134. Bore 200 is, of course, adapted to be in alignment with bore 162 and bore 174 of housing 134 to thereby permit drainage of fluid from the gear box and also to permit plug 164 to be passed therethrough to a position where magnet 202 will be inside the gear case, as previously described. Except as just pointed out, the embodiment of FIGURES 10 and 11 works in substantially the same way as the previously described embodiments. Briefly, the plug may be removed by unscrewing plug 164 from housing 134. As soon as the plug has been unscrewed upper portion 166 will be withdrawn into bore 200 of valve 182 so as to clear the housing 134. Plug 164 will then be used as a lever to rotate valve 182 through 90° of counterclockwise rotation until flat 198 acts as a stop against shoulder 186 of housing 134. When this 90° of rotation has taken place valve 182 has closed bore 162 and the plug 164 may be removed from bore 200 of the valve 182 and inspected. Valve 182 may thereafter be manipulated by 90° of clockwise rotation to drain the gear case or it may be rotated still further until flat 194 is aligned with shoulder 186 and removed completely from housing 134 by simply pushing it to the left.

Having described the present invention, it is obvious that various modifications may be made without departing therefrom. Accordingly, the present invention is limited only in accordance with the appended claims.

I claim:

1. A drain unit, for use in connection with a gear case or the like, comprising:
   (a) an annular upper casing member having one end internally and externally threaded and its other end formed as an enlarged flange portion with a gripping surface on its exterior and a central bore larger than the bore through the internally-threaded portion to thereby form a shoulder where said ends meet;
   (b) a washer-shaped spring in said bore of said flange portion abutting against said shoulder;
   (c) an annular valve seat abutting against said washer-shaped spring and surrounded by a packing which forms a seal against the sides of said bore of said flange portion;
   (d) a ball-shaped valve slightly larger in diameter than the minor diameter of the annular seat and adapted to fit against said seat in sealing engagement therewith, said ball valve having a central bore passing therethrough and being of a diameter substantially equal to the diameter of the internally-threaded portion of said upper casing;
   (e) cylindrical pivot extensions formed on two opposing sides of said ball valve perpendicular to said central bore of said ball valve and having bores formed in the centers thereof;
   (f) a pair of coil springs adapted to fit in said bores of said pivot extensions and having one end anchored to said ball valve;
   (g) a lower cup-shaped casing, enclosing said ball valve and said pivot extensions, and having a restricted opening in its bottom substantially equal in diameter to the bore through said ball valve, said opening being extended across the bottom and up one side of said casing to form a slot, and appropriate anchor slots for the other ends of said coil springs;
   (h) a stop means in said lower casing adapted to cooperate with a depression in one of said pivot extensions to restrict the rotation of said ball valve to a 90° angle;
   (i) a cylindrical, elongated plug having a diameter equal to the bore through the internally-threaded portion of said upper casing and the central bore of said ball valve, a length greater than the total length of said upper and said lower casings when assembled, one end threaded to cooperate with the threads on the internally-threaded portion of the upper casing and an enlarged flange with an exterior gripping surface on its other end;
   (j) a packing surrounding said plug immediately below the threads on said plug; and
   (k) a permanent magnet mounted on the threaded end of said plug and adapted to pass through said upper casing and be exposed to fluid in the gear case into which said upper casing is inserted, and just clearing the interior of said upper and lower casings as said packing on said plug clears the interior of said ball valve during withdrawal of said plug from said drain unit, thereby permitting said ball valve to rotate 90° under the tension of said coil springs and said plug to turn through the slot in the side of said lower casing.

2. A drain unit, for use in connection with a gear case or the like, comprising:
   (a) a housing having a central bore therethrough to form a drain passage and adapted to be mounted in an opening in a gear case with said drain passage in open communication with the interior of said gear case;
   (b) valve means mounted in the bore of said housing in a position below the interior drain level of said gear case when said housing is mounted in said gear case for alternately opening and closing said drain passage;
   (c) spring means adapted to urge said valve means toward its closed position;
   (d) plug means, mounted in said drain passage and passing through said housing and said valve means to the interior of said gear case, for holding said valve open and closing said drain passage when inserted in said housing and to maintain said drain passage closed until said valve closes as it is being removed from said housing; and
   (e) a magnet mounted on the end of said plug extending beyond said housing and into said gear case, whereby said magnet is freely exposed to fluids in said gear case.

3. A drain unit in accordance with claim 2 wherein the valve means is a ball-type valve having a bore therethrough which rotates through an angle of 90° and is biased in its closed position by the spring means.

4. A drain unit in accordance with claim 2 wherein the valve means is a ball-type valve having a bore therethrough which rotates through an angle of 90° and is biased in its closed position by the spring means and wherein the plug means passes through said bore and has an external packing which remains in sealing engagement with the walls of said bore until said plug clears the interior of the housing and the ball and plug are rotated to their secondary position by said spring means.

5. A drain unit, for use in connection with a gear case or the like, comprising:

(a) a housing having a central bore therethrough to form a drain passage and adapted to be mounted in an opening in a gear case with said drain passage in open communication with the interior of said gear case;
(b) valve means, rotatably mounted within said housing, having a bore therethrough adapted to register with said drain passage in said housing in one rotative position of said valve means;
(c) elongated plug means, adapted to pass through an opening in said housing at a position angularly displaced from the central axis of said drain passage, and in sealing engagement with said bore in said valve means;
(d) said angular position of said opening in said housing being such that said bore of said valve means is out of register with said drain passage when aligned with said opening in said housing and said drain passage is closed by said valve means;
(e) said opening in said housing for said plug means being extended a distance sufficient to permit said plug means to rotate through said housing and rotate said valve means an angular distance sufficient to bring said bore in said valve means in alignment with said drain passage in said housing and permit said plug means to pass through said drain passage to the interior of said gear case; and
(f) magnet means mounted on the end of said plug means which extends into said gear case.

6. A drain unit in accordance with claim 5 wherein the housing is threadably mounted in the opening in the gear case.

7. A drain unit in accordance with claim 5 wherein the housing is slidably mounted in the opening in the gear case in sealing engagement therewith.

8. A drain unit in accordance with claim 5 which includes a C washer adapted to be mounted on the housing and said housing is attached to the gear case by screw means passing through said washer and threaded into said gear case.

9. A drain unit in accordance with claim 5 wherein the valve means is cylindrical and is mounted with the axis of said cylinder perpendicular to the axis of the drain passage in the housing.

10. A drain unit in accordance with claim 9 wherein the bore through the valve means is perpendicular to the axis of the cylinder and said cylinder is rotatable about its central axis.

11. A drain unit in accordance with claim 9 wherein the valve means passes entirely through the housing.

12. A drain unit in accordance with claim 11 wherein the housing includes stop means adapted to register with an annular peripheral groove about each end of the valve means to retain said valve means in said housing for the major portion of its rotational movement.

13. A drain unit in accordance with claim 12 wherein the valve means has a flat side formed thereon adapted to clear the stop means in the housing and permit the removal and reinsertion of the valve means in the housing.

14. A drain unit in accordance with claim 12 wherein the valve means includes flange means adapted to cooperate with the stop means in the housing to stop the rotation of said valve means when the bore of said valve means is out of register with the drain passage in said housing.

15. A drain unit in accordance with claim 5 wherein the plug means has formed thereon a shoulder adapted to cooperate with stop means formed in the housing to prevent the withdrawal of the plug means when the bore in the valve means is aligned with the drain passage in said housing.

16. A drain unit in accordance with claim 5 wherein the plug means is adapted to threadably mount in the housing when said plug means passes through the drain passage in the housing.

17. A drain unit in accordance with claim 5 wherein the housing has formed therein an arcuate slot extending from a point adjacent the axis of the drain passage to a point adjacent an axis perpendicular to the axis of the drain passage.

18. A drain unit in accordance with claim 17 wherein the end of a slot adjacent the axis perpendicular to the axis of the drain passage is enlarged an amount sufficient to permit passage of an enlarged end of the plug means therethrough and the remainder of the slot will prevent the passage of said enlarged end therethrough.

References Cited by the Examiner
UNITED STATES PATENTS

| | | | |
|---|---|---|---|
| 2,704,156 | 3/1955 | Botstiber | 210—222 |
| 2,983,385 | 5/1961 | Botstiber | 210—222 |

SAMUEL ROTHBERG, *Primary Examiner.*

LAVERNE D. GEIGER, *Examiner.*

H. BELL, *Assistant Examiner.*